US005400821A

United States Patent [19]

Ott

[11] Patent Number: 5,400,821

[45] Date of Patent: Mar. 28, 1995

[54] DIRECTIONAL CONTROL VALVE

[75] Inventor: Helmut Ott, Stuttgart, Germany

[73] Assignee: Herion Werke AG, Germany

[21] Appl. No.: 124,108

[22] Filed: Sep. 20, 1993

[30] Foreign Application Priority Data

Sep. 29, 1992 [DE] Germany ........................ 42 32 628.1

[51] Int. Cl.$^6$ .............................................. F16K 11/07

[52] U.S. Cl. .................................. 137/614.2; 91/446; 137/854; 137/884

[58] Field of Search ............ 91/446; 137/596.2, 614.2, 137/854, 884

[56] References Cited

U.S. PATENT DOCUMENTS 3,126,795 3/1964 Kesselring ........................ 91/446 X
4,377,183 3/1983 Johansson ....................... 137/884 X
4,485,846 12/1984 Neff ................................ 137/884 X
4,550,749 11/1985 Krikorian ........................ 137/854 X
4,770,209 9/1988 Neff ................................ 137/884 X
5,054,517 10/1991 Liesenhoff ...................... 137/854 X

*Primary Examiner*—Robert G. Nilson
*Attorney, Agent, or Firm*—Henry M. Feiereisen

[57] ABSTRACT

A directional control valve for compressed air with an inlet port, at least one consumer port and at least one vent port includes a housing accommodating a control piston for controlling the connection between the inlet port, the consumer port and the vent port, and a one-way restrictor arrangement. The one-way restrictor arrangement is fitted directly within the housing between the vent port and the consumer port, transversely to the longitudinal axis of the control piston. In this manner, a flow of compressed air to the consumer is prevented upon occurrence of a dynamic pressure.

6 Claims, 2 Drawing Sheets

DIRECTIONAL CONTROL VALVE

BACKGROUND OF THE INVENTION

The present invention relates to a directional control valve for compressed air, and in particular to a directional control valve which is mounted on an adapter plate and is of the type having a housing accommodating a control piston by which the connection between an inlet port, at least one consumer port and at least one vent port is controlled, wherein a one-way restrictor is arranged between the vent port and the consumer port.

In directional control valves of this type, in particular when being mounted on adaptor plates with common ventilation, the occurrence of dynamic pressures in the vent ports should not result in an undesired flow of fluid to the consumer or consumers and thus in undesired cylinder motions. Therefore, it is necessary to prevent a return flow of compressed air from the common ventilation to the consumer ports. Conventionally, such devices to prevent a return flow include an intermediate plate with a non-return valve (check valve) between the valve block and the adapter plate. These devices are, however, of great dimensions and expensive.

SUMMARY OF THE INVENTION

It is an object of the present invention to provide an improved directional control valve obviating the aforestated drawbacks.

In particular, it is an object of the present invention to provide an improved directional control valve which is equipped in a simple, compact and space-saving manner with one or more one-way restrictors.

These objects, and others which will become apparent hereinafter are attained in accordance with the present invention by arranging the one-way restrictor directly within the housing of the directional control valve transversely to the longitudinal axis of the control piston.

In a directional control valve with several consumer ports, each such consumer port is provided with such a one-way restrictor.

According to another feature of the present invention, the one way restrictor comprises a throttle element and a non-return element and is made in form of a single molded piece of e.g. flexible, elastic plastic material such as elastomer. Advantageously, the molded piece is mounted onto the shank of an adjusting screw by which the cross-sectional area between the housing of the directional control valve and the molded piece is adjustable.

The installation of the one-way restrictor directly within the housing of the directional control valve, transversely to the axial extension of the control piston results in a simple, compact and space-saving design and arrangement of the one-way restrictor.

Suitably, the housing includes a stepped bore to define two bore sections, with one bore section forming with the molded piece the throttle element and with the other bore section forming with the molded piece the non-return element.

Preferably, the adjusting screw is accessible from the outside so that the throttle cross-section of the one-way restrictor can be modified even when the directional control valve is mounted to the adapter plate. Moreover, the attachment of the molded piece onto the shank of the adjusting screw secures the adjusting screw against loosening.

BRIEF DESCRIPTION OF THE DRAWING

The above objects, features and advantages of the present invention will now be described in more detail with reference to the accompanying drawing, in which.

DETAILED DESCRIPTION OF A PREFERRED EMBODIMENT

Figure 1:
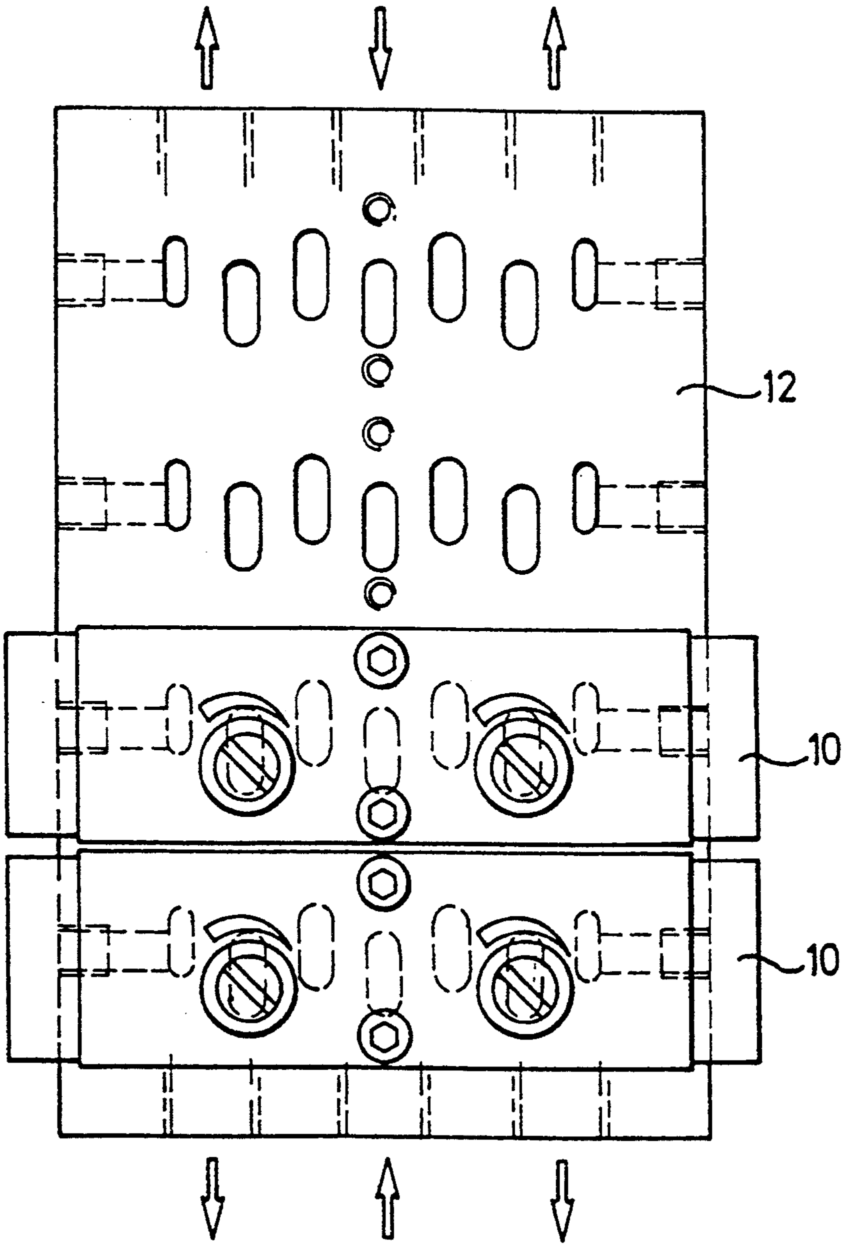
FIG. 1 is a top view of two directional control valves according to the present invention, mounted on a common adapter plate.

Referring now to the drawing and in particular to FIG. 1, there is shown a schematic top view of two directional control valves 10 mounted next to each other on a common adapter plate 12 which includes a common inlet line and a common vent line. In the non-limiting example of FIG. 1, the adapter plate 12 includes four connections for attachment of respective directional control valves 10.

Figure 2:
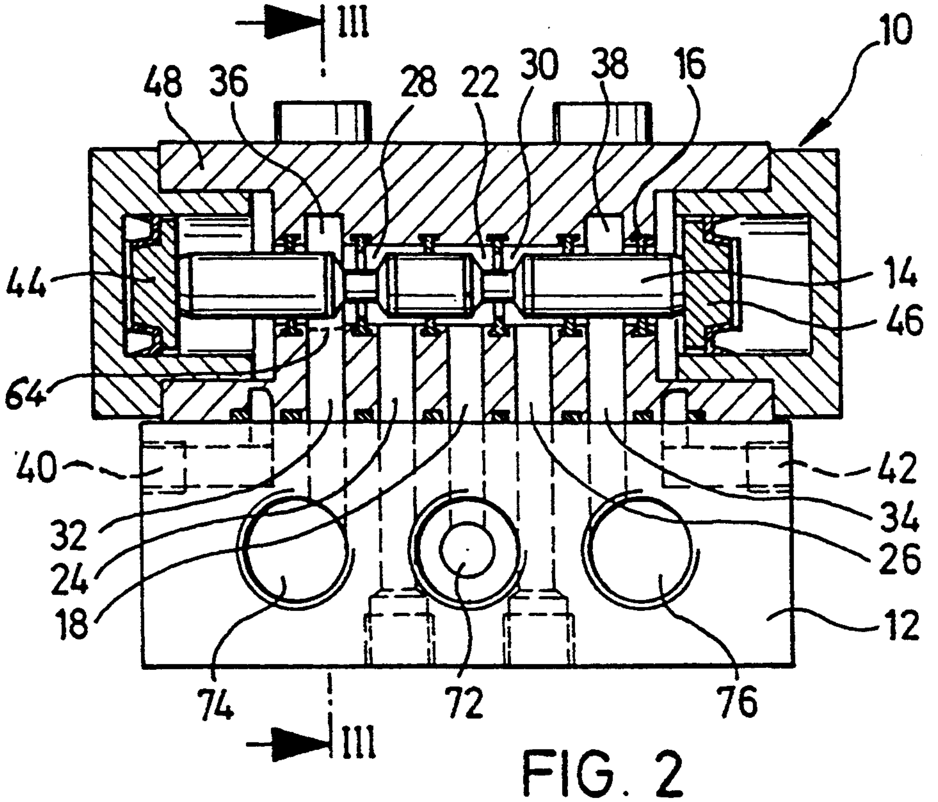
FIG. 2 is a cross-section through one of the directional control valves according to FIG. 1.

Turning now to FIG. 2, there is shown a cross-sectional view through one of the directional control valves 10 according to FIG. 1, with the adapter plate 12 having one inlet line 72 and two vent lines 74, 76 which are commonly connected to all directional control valves 10. The control valve. 10 includes a housing 48 which accommodates a control piston 14 guided in a bore within the housing 48 for movement in axial direction and suitably sealed therein via seals 16. At its opposite axial ends, the control piston 14 is provided with a working piston 44, 46 which are respectively connected to working ports 40, 42 for admission of compressed air in order to move the control piston 14 into the desired position.

The mode of operation of a directional control valve of this type is generally known, and therefore, a detailed description has been omitted for sake of simplicity.

The housing 48 further accommodates an inlet port 18 which communicates with the inlet line 72, two consumer ports 24, 26 which are connected to respective consumers (not shown), two vent ports 32, 34 which are suitably connected to the vent line 74, 76.

The inlet port 18 communicates with an inlet chamber 22, the consumer ports 24,. 26 communicate with respective consumer chambers 28, 30 and the vent ports 32, 34 communicate respectively with vent: chambers 36, 38. The inlet chamber 22, the consumer chambers 28, 30 as well as the vent chambers 36, 38 are all parts of the bore in which the control piston 14 is guided for axial movement.

Figure 3:
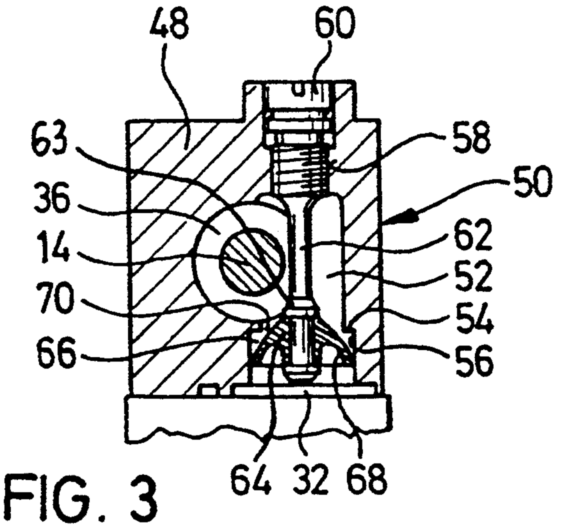
FIG. 3 is a sectional view taken along line III—III in FIG. 2, illustrating in detail a one-way restrictor arrangement.

Incorporated between the consumer port 24 and the vent port 32 and also between the consumer port 26 and the vent port 34 is a respective one-way restrictor arrangement which is shown in more detail in FIG. 3 by way of a cross-sectional view taken along the line III—III in FIG. 2 and generally designated by reference numeral 50. By way of example, FIG. 3 illustrated in detail a one-way restrictor arrangement 50 fitted between the consumer port 24 and the vent port 32 in the area of the vent chamber 36, with the one-way restrictor arrangement 50 extending in a bore 52 of the housing 48. The bore 52 defines an axis extending transversely to the longitudinal axis of the control piston 14 and is in communication with the vent chamber 36.

As shown in FIG. 3, the bore 52 is of stepped configuration and thus widens in a bore 56 of greater diameter than the diameter of the bore 52, so that a shoulder 54 is formed at the junction between the bore 52 and the bore 56 which communicates with the vent port 32.

The upper area of the bore 52 is provided with an internal thread 58 which is threadably engaged by an adjusting screw 60 extending through the bores 52, 56. The adjusting screw 60 is accessible and thus actuatable from outside and includes a shank 62 of reduced diameter which traverses the bore 52 and the bore 56. At its end which is distal to the thread 58, the shank 62 supports a molded piece 64 which e.g. may be retained or clamped onto the shank 62 between two collars 63. The generally ring-shaped molded piece 64 which is shown in FIG. 2 only by way of a dashed line as part of the one-way restrictor arrangement 50 for regulating a fluid flow between the vent chamber 36 and the vent port 32, includes a central bore for passage of the shank 62 and an annular lip 68 which bears against the wall of the bore 56 in the illustration of FIG. 3. The molded piece 64 is suitably made of flexible, elastic plastic material such as elastomer e.g. polyurethane, polyamide or the like so as to allow the molded piece 64 to be placed over the outer collar 63 onto the shank 62 until being secured between both collars 63.

As further seen in FIG. 3, an annular gap 70 is formed between the molded piece 64 and the shoulder 54 at the junction between the bores 52 and 56. The area of this gap 70, and thus the cross-sectional area between the housing 48 and the molded piece 64 for passage of fluid, can be modified from outside by suitably setting the adjusting screw 60.

At normal operation, compressed air returns from the consumer port 24 via the consumer chamber 28 and via the vent chamber 36 to the vent port 32, as illustrated in FIG. 2, so that compressed air flows through the annular gap 70 into a space 66 which is part of the bore 56 to thereby lift the annular lip 68 of the molded piece 64 from the wall of the bore 56 and to allow connection to the vent port 32. Thus, compressed air can flow from the consumer port 24 to the vent port 32, with this return flow being suitably throttled through change of the throttle cross-sectional area.

At occurrence of a dynamic pressure in the vent line 74 and tendency of compressed air to flow in reverse direction through the one-way restrictor arrangement 50, i.e. from the vent port 32 to the consumer port 24, then, the annular lip 68 of the molded piece 64 bears upon the wall of the bore 56 and thus prevents a passage of compressed air in this direction. An undesired flow of compressed air to the consumer via the consumer port 24 is thus prevented.

The molded piece 64 thus forms together with the housing 48 the throttle element as well as the non-return element (check valve) of the one-way restrictor 50.

Through installation of a one-way restrictor arrangement 50 according to the present invention directly within the housing 48 in a direction transversely to the bore in which the control piston 14 is fitted, a simple, compact and space-saving and thus cost-effective design and arrangement of the one-way restrictor 50 within the directional control valve 10 is attained.

While the invention has been illustrated and described as embodied in a directional control valve, it is not intended to be limited to the details shown since various modifications and structural changes may be made without departing in any way from the spirit of the present invention.

What is claimed as new and desired to be protected by Letters Patent is set forth in the appended claims:

1. A directional control valve for regulating the flow of a fluid and adaptable for connection onto an adaptor plate, comprising:

a housing accommodating a control piston which defines a longitudinal axis and controls a connection between an inlet port, at least one consumer port and at least one vent port; and a one-way restrictor arranged directly within said housing between said vent port and said consumer port, transversely to said longitudinal axis of said control piston, said one-way restrictor including a throttle element and a non-return element, which are made in form of a single molded piece.

2. A directional control valve as defined in claim 1, wherein said molded piece is made of a flexible, elastic plastic material.

3. A directional control valve as defined in claim 1, wherein said housing includes a stepped bore to define two bore sections, with one bore section forming together with said molded piece the throttle element and with said other section bore forming together with said molded piece the non-return element.

4. A directional control valve as defined in claim 1, further comprising an adjusting screw for modifying said cross-sectional area between said housing and said molded piece, said adjusting screw including a shank supporting said molded piece.

5. A directional control valve as defined in claim 4, wherein said adjusting screw extends beyond said stepped bore towards the outside so as to be accessible and actuatable from outside.

6. A directional control valve as defined in claim 4, wherein said adjusting screw is secured against loosening by said molded piece which bears against an inside wall of said stepped bore.

* * * * *